United States Patent
Minagawa et al.

(10) Patent No.: US 9,393,530 B2
(45) Date of Patent: Jul. 19, 2016

(54) PROCESS FOR PRODUCTION OF POROUS MEMBRANE

(75) Inventors: Masakazu Minagawa, Toyohashi (JP); Masashi Teramachi, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 170 days.

(21) Appl. No.: 13/261,454

(22) PCT Filed: Apr. 5, 2011

(86) PCT No.: PCT/JP2011/058588
§ 371 (c)(1),
(2), (4) Date: Nov. 8, 2012

(87) PCT Pub. No.: WO2011/126001
PCT Pub. Date: Oct. 13, 2011

(65) Prior Publication Data
US 2013/0049246 A1 Feb. 28, 2013

(30) Foreign Application Priority Data
Apr. 5, 2010 (JP) ................................. 2010-087260

(51) Int. Cl.
| | | |
|---|---|---|
| B01D 67/00 | (2006.01) | |
| B01D 71/34 | (2006.01) | |
| C08J 9/26 | (2006.01) | |
| B01D 69/06 | (2006.01) | |
| B01D 69/08 | (2006.01) | |
| B01D 69/10 | (2006.01) | |
| B01D 71/12 | (2006.01) | |
| B01D 71/40 | (2006.01) | |
| B01D 71/42 | (2006.01) | |
| B01D 71/48 | (2006.01) | |
| B01D 71/56 | (2006.01) | |
| B01D 71/68 | (2006.01) | |

(52) U.S. Cl.
CPC .......... *B01D 67/0011* (2013.01); *B01D 67/003* (2013.01); *B01D 69/06* (2013.01); *B01D 69/08* (2013.01); *B01D 69/10* (2013.01); *B01D 71/12* (2013.01); *B01D 71/34* (2013.01); *B01D 71/40* (2013.01); *B01D 71/42* (2013.01); *B01D 71/48* (2013.01); *B01D 71/56* (2013.01); *B01D 71/68* (2013.01); *C08J 9/26* (2013.01); *B01D 2323/06* (2013.01); *B01D 2323/22* (2013.01); *B01D 2325/20* (2013.01); *B01D 2325/36* (2013.01); *C08J 2201/0464* (2013.01); *C08J 2327/16* (2013.01)

(58) Field of Classification Search
CPC ................................................ B01D 67/0013
See application file for complete search history.

(56) References Cited

U.S. PATENT DOCUMENTS

| | | | | |
|---|---|---|---|---|
| 6,110,309 | A * | 8/2000 | Wang et al. .................... | 264/216 |
| 6,146,747 | A * | 11/2000 | Wang ..................... | B01D 39/083 |
| | | | | 210/490 |
| 7,070,721 | B2 * | 7/2006 | Ji et al. ............................ | 264/41 |
| 2003/0141251 | A1 | 7/2003 | Ji et al. | |
| 2005/0103716 | A1 | 5/2005 | Ji et al. | |
| 2011/0114553 | A1 | 5/2011 | Teramachi et al. | |

FOREIGN PATENT DOCUMENTS

| | | |
|---|---|---|
| CN | 1128176 A | 8/1996 |
| CN | 101091880 A | 12/2007 |
| JP | 60 97001 | 5/1985 |
| JP | 2 298323 | 12/1990 |
| JP | 2003 290638 | 10/2003 |
| JP | 2004 105804 | 4/2004 |
| JP | 2004 217900 | 8/2004 |
| JP | 2005 296849 | 10/2005 |
| JP | 2006 257216 | 9/2006 |
| JP | 2008 120953 | 5/2008 |
| JP | 2009 160490 | 7/2009 |
| WO | 2009 142279 | 11/2009 |

OTHER PUBLICATIONS

Deshmukh, S.P., et al., "Effect of ethanol composition in water coagulation bath on morphology of PVDF hollow fibre membranes," Journal of Membrane Science, vol. 150, pp. 75-85, (1998).
Wang, D., et al., "Preparation and characterization of polyvinylidene fluoride (PVDF) hollow fiber membranes," Journal of Membrane Science, vol. 163, pp. 211-220, (1999).
International Search Report Issued Jun. 7, 2011 in PCT/JP11/058588 Filed Apr. 5, 2011 in PCT/JP11/058588.
Combined Office Action and Search Report issued Jun. 26, 2013 in Chinese Application No. 201180026794.3 (With English Translation).
Extended European Search Report issued Dec. 16, 2013 in Patent Application No. 11765901.1.

(Continued)

*Primary Examiner* — Alison L Hindenlang
(74) *Attorney, Agent, or Firm* — Oblon, McClelland, Maier & Neustadt, L.L.P.

(57) ABSTRACT

Disclosed is a process for production of a porous membrane that includes the steps of layering a film-forming dope that contains a polymer (A) that forms a membrane base, a polyvinylpyrrolidone (B) and a solvent (C) into a single layer or two or more layers; immersing the film-forming dope in a solidifying fluid that is a non-solvent with respect to the polymer (A) and is a good solvent with respect to the polyvinylpyrrolidone (B); and removing the polyvinylpyrrolidone (B), wherein the polyvinylpyrrolidone (B) has a K value of 50 to 80, a mass ratio r of the polyvinylpyrrolidone (B) to the polymer (A) is 0.5 or more and less than 1, and the viscosity of the film-forming dope at a membrane production temperature is 100 to 500 Pa·s. Accordingly, by using an appropriate amount of a low-molecular-weight hydrophilic polymer capable of being easily removed, it is possible to produce a porous membrane of a three-dimensional network structure in which macrovoids are suppressed, having high water permeability and superior filtration performance.

8 Claims, No Drawings

(56) References Cited

OTHER PUBLICATIONS

Combined Chinese Office Action and Search Report issued Dec. 19, 2013 in Patent Application No. 201180026794.3 (with English language transition).

I.M. Wienk, et al., "Spinning of hollow fiber ultrafiltration membranes from a polymer blend" Journal of Membrane Science, vol. 106, No. 3, XP004041256, Oct. 31, 1995, pp. 233-243.

Qian Yang, et al., "Tailoring pore size and pore size distribution of kidney dialysis hollow fiber membranes via dual-bath coagulation approach" Journal of Membrane Science, vol. 290, No. 1-2, XP005745224, Feb. 10, 2007, pp. 153-163.

* cited by examiner

PROCESS FOR PRODUCTION OF POROUS MEMBRANE

TECHNICAL FIELD

The present invention relates to a process for production f a porous membrane used in water treatment or the like.

Priority is claimed on Japanese Patent Application No. 2010-087260, filed Apr. 5, 2010, the content of which is incorporated herein by reference.

BACKGROUND ART

In recent years, according to high interest in environmental pollution and consolidated regulations, a water treatment technique that employs a filter membrane superior in view of completeness of separation of contaminants and compactness or the like has attracted attention.

As a process for production of a porous membrane used as a filter membrane, a non-solvent phase separation technique (refer to NPLs 1 and 2, for example) that uses a non-solvent phase separation phenomenon in which a polymer solution is phase-separated by a non-solvent to become porous is known.

As the non-solvent phase separation technique, a wet spinning method or a dry and wet spinning method (hereinafter, both spinning methods are referred to as wet spinning) is known. A porous membrane obtained by such wet spinning may provide a high filtration flow rate and a good fractionation layer, and is thus suitable for a large amount of water treatment.

In production of a porous membrane using such wet spinning, a porous structure is adjusted by changing membrane production conditions such as composition and temperature of a film-forming dope and a solidification bath. For example, in order to adjust the viscosity of an undiluted solution in an appropriate range in membrane production, to achieve stabilization of the membrane production state, and to cause phase separation for forming a three-dimensional network structure superior in water permeability, a hydrophilic polymer is added as an additive in addition to a polymer that forms a membrane base. In many cases; as the hydrophilic polymer, a high-molecular-weight polymer such as polyethylene glycol or polyvinylpyrrolidone is used. Further, the hydrophilic polymer is removed from the membrane by cleaning or the like after the film-forming dope is immersed in a solidifying fluid.

As a production method of such a porous membrane using the hydrophilic polymer, PTL 1 discloses a method of solidifying, in a flow casting manner, a film-forming dope that contains four components of polyvinylidene fluoride, a good solvent of the polymer, a poor solvent of the polymer and a water-soluble polymer.

Further, PTL 2 discloses a method of individually measuring the kinematic viscosity and storage elastic modulus with respect to each of a polymer that forms a membrane base and a hydrophilic polymer and combining these polymers for use so that the values of the kinematic viscosities and the storage elastic moduli are equal to each other between the polymer that forms the membrane base and the hydrophilic polymer, in preparation of a film-forming dope where the polymer that forms the membrane base and the hydrophilic polymer are dissolved in a solvent.

According to these methods disclosed in PTLs 1 and 2, a membrane of a three-dimensional network structure having high water permeability and superior filtration performance may be achieved.

CITATION LIST

Patent Literature

[PTL 1] Japanese Unexamined Patent Application, First Publication No. S60-97001
[PTL 2] Japanese Unexamined Patent Application, First Publication No. 2004-217900
[PTL 3] Japanese Unexamined Patent Application, First Publication No. 2005-296849
[PTL 4] PCT International Publication No. WO 2009/142279

Non Patent Literature

[NPL 1] Journal of Membrane Science 150 (1998), pp 75-82
[NPL 2] Journal of Membrane Science 163 (1999), pp 211-220

DISCLOSURE OF INVENTION

Problems to be Solved by the Invention

However, in the method disclosed in PTL 1, as the poor solvent, it is necessary to use an organic solvent having high flammability and hazardousness such as water-soluble ketone, aldehyde or cyclic ester. Further, in many cases, since various types of additive materials should be used to adjust the undiluted solution, the production process of the film-forming dope may be complicated.

Further, in the non-solvent phase separation method, defects generally called macrovoids that cause a strength decrease in the membrane and a decrease in completeness of the membrane structure, are easily generated. In order to suppress the generation of the macrovoids, it is preferable to increase the viscosity of the film-forming dope by using a high-molecular-weight polymer as the polymer that forms the membrane base. However, in the method disclosed in PTL 2, in a case where the high-molecular-weight polymer is used as the polymer that forms the membrane base in this way, it is also necessary to use a high-molecular-weight polymer as the hydrophilic polymer. In a case where the hydrophilic polymer is removed after the film-forming dope is immersed in a solidifying fluid, the hydrophilic high-molecular-weight polymer is difficult to remove.

On the other hand, the method disclosed in PTL 2 is preferable in that it is not necessary to use a poor solvent, in a similar way to the invention disclosed in PTL 1.

However, in the method disclosed in PTL 2, in many cases, plural types of different polymers should be mixed to be used as the polymer that forms the membrane base in order to cause the values of the kinematic viscosities and the storage elastic moduli of the polymer that forms the membrane base and the hydrophilic polymer to be equal to each other.

In this case, compared with a case where one type of polymer is used, the mixing process in preparation of the film-forming dope is complicated, and management of the film-forming dope is difficult.

Further, even though the method disclosed in PTL 2 is employed, the macrovoids may be generated according to the mass ratio of the polymer that forms the membrane base and the hydrophilic polymer and/or the viscosity of the film-forming dope.

Further, in PTL 3, considering that the hydrophilic high-molecular-weight polymer is difficult to remove, a technique has been studied in which a low-molecular-weight polymer capable of being relatively easily removed is used as a hydrophilic polymer. However, in a case where the low-molecular-weight polymer is used, unless a large amount of polymer is used compared with the high-molecular-weight polymer, it is difficult to achieve an effect due to usage of the hydrophilic polymer. In a case where the large amount of hydrophilic polymer is used, unless a recovery process is not provided, a problem occurs in cost, which is not preferable.

PTL 4 discloses a production method of a porous membrane in which a film-forming dope having a relatively high viscosity of hundreds of Pa·s is layered and then solidified. However, the internal structure thereof may become a sponge-like structure having a low connection of pores compared with a three-dimensional network structure, according to combination of the film-forming dope. Further, washability of polyvinylpyrrolidone added is not discussed.

In view of the above problems, an object of the invention is to provide a process for production of a porous membrane that is capable of forming a three-dimensional network structure in which macrovoids are suppressed, having high water permeability and superior filtration performance, by using an appropriate amount of a low-molecular-weight hydrophilic polymer that is easily removed.

Means to Solve the Problems

The inventors have found that when a film-forming dope is prepared by using a polymer that forms a membrane base and a low-molecular-weight polyvinylpyrrolidone (hydrophilic polymer) capable of being relatively easily removed as a hydrophilic polymer, if the film-forming dope is prepared so that the mass ratio of the polymer that forms the base and the polyvinyl pyrrolidone satisfies a specific relationship and the viscosity of the film-forming dope at that time is in a specific range, an excellent effect may be obtained.

That is, the inventors have found that when such a film-forming dope is used, by using an appropriate amount of a low-molecular-weight hydrophilic polymer capable of being easily removed without using a large amount, it is possible to form a porous membrane having a three-dimensional network structure in which macrovoids are suppressed, having high water permeability and superior filtration performance, and have completed the invention.

Here, the term "three-dimensional network structure" refers to a network structure that substantially does not have spherical pores that are coarse and independent, in which a polymer that forms a porous membrane has the shape of fibrils connected to each other in a three-dimensional manner. In the production method of the porous membrane according to the invention, each layer formed by a membrane base (A) is formed with a three-dimensional stitch structure that is generally approximately uniform. Here, in a case where a support in addition to the membrane base is used, the entirety of each layer formed by the membrane base (A) other than the support is formed with the three-dimensional stitch structure.

There is provided a process for production of a porous membrane that includes the steps of: immersing a film-forming dope that contains a polymer (A) that forms a membrane base, a polyvinylpyrrolidone (B) and a solvent (C) in a solidifying fluid that is a non-solvent with respect to the polymer (A) and is a good solvent with respect to the polyvinylpyrrolidone (B); and removing the polyvinylpyrrolidone (B), wherein the polyvinylpyrrolidone (B) has a K value of 50 to 80, and wherein a mass ratio r of the polyvinylpyrrolidone (B) to the polymer (A) is 0.5 or more and less than 1, and the viscosity of the film-forming dope at a membrane production temperature is 100 to 500 Pa·s. The film-forming dope is layered into a single layer or two or more layers, and is immersed in the solidifying fluid. The K value of the polyvinylpyrrolidone (B) is preferably 50 to 60, and the polymer (A) is preferably polyvinylidene fluoride.

Effect of the Invention

According to the process for production of the invention, it is possible to produce a porous membrane having a three-dimensional network structure in which macrovoids are suppressed, having high water permeability and superior filtration performance, by using an appropriate amount of a low-molecular-weight hydrophilic polymer that is easily removed.

EMBODIMENTS FOR CARRYING OUT THE INVENTION

Hereinafter, a method for production of a porous membrane according to the invention will be described in detail.

The method for production of the porous membrane according to the invention is based on wet spinning, and includes preparation of a film-forming dope that contains a polymer (A) that forms a membrane base, polyvinylpyrrolidone (B) as a hydrophilic polymer that controls phase separation, and a solvent (C). Here, as the solvent (C), a common good solvent capable of dissolving both of the polymer (A) and the polyvinylpyrrolidone (B) is used. Hereinafter, the polyvinylpyrrolidone may be referred to as PVP.

Here, as the polymer (A), any polymer capable of forming a porous membrane by means of wet spinning may be used, and for example, a polysulfone-based resin such as polysulfone or polyether sulfone, polyacrylonitrile, cellulose derivatives, a fluorine-based resin such as polyvinylidene fluoride, polyamide, polyester, polymethacrylate, polyacrylate, or the like may be used. Further, a copolymer of these resins or a polymer obtained by introducing a substituent into a part thereof may be used. Further, the same type of polymers having different molecular weights may be blended for use, or two or more types of resins may be mixed. Here, in view of oxidation deteriorating resistance, thermal resistance and solubility to a solvent, the polyvinylidene fluoride is preferable.

Polyvinylidene fluoride refers to a resin that contains vinylidene fluoride homopolymer and/or vinylidene fluoride copolymer. Further, to the degree that an effect of the invention is not damaged, a functional group such as a hydroxyl group, a carboxylic acid group or the like may be introduced into the polyvinylidene fluoride.

Here, when the polymer (A) in the film-forming dope is less than 10 mass %, the viscosity of the film-forming dope decreases, macrovoids are easily formed in a porous membrane, and thus, the membrane intensity of the porous membrane tends to decrease. Thus, the concentration of the polymer (A) in the film-forming dope is preferably 10 mass % or more, and is more preferably 15 mass % or more. On the other hand, if the concentration of the polymer (A) exceeds 30 mass %, the porosity in the porous membrane decreases, and thus, water permeability tends to decrease. Thus, the concentration of the polymer (A) in the film-forming dope is preferably 30 mass % or less, and is more preferably 25 mass % or less. That is, the concentration of the polymer (A) in the film-forming dope is preferably 10 mass % or more and 30 mass % or less, and is more preferably 15 mass % or more and 25 mass % or less.

Further, in a case where the molecular weight of the polymer (A) is small, the viscosity of the film-forming dope decreases, and the macrovoids tend to be easily generated. In this view, the polymer (A) is preferably a polymer having a weight average molecular weight of 100,000 or more. On the other hand, in a case where the molecular weight of the polymer (A) is extremely large, dissolution into a solvent is difficult, and there is a tendency towards gelation, and thus, the polymer (A) is preferably a polymer having a weight average molecular weight of 5,000,000 or less.

As the PVP (B) that is a hydrophilic polymer, a polymer having a K value of 50 to 80 is used.

Here, the K value is widely used as a parameter corresponding to the molecular weight of the PVP, and is calculated using the following expression (1) on the basis of a kinematic viscosity measurement result according to a capillary tube viscosity calculation scheme of a PVP aqueous solution.

[Expression 1]

$$K = \frac{1.5 \log \eta_{rel} - 1}{0.15 + 0.003\,c} + \frac{[300\,c \log \eta_{rel} + 2(c + 1.5 \log \eta_{rel})]^{1/2}}{0.15c + 0.003\,c^2} \quad (1)$$

(Here, c represents mass (g) of the PVP in a solution of 100 ml, and $\eta_{rel}$ represents the ratio of the kinematic viscosity of the PVP aqueous solution to the kinematic viscosity of water.)

If such a PVP (B) is used, it is possible to form a porous membrane of a favorable three-dimensional network structure by using an appropriate amount of PVP (B) without excessive use thereof. Further, the PVP (B) is easily removed by cleaning or the like after solidification. More preferably, the PVP (B) having the K value of 50 to 60 is used.

Generally, as an actual K value of a PVP that is commercially available as K-90 has variation of about 80 to 100, in PVPs of the same grade made by the same producer, there is variation in the K value. Further, the K value may decrease due to oxidative degradation or the like, or may increase due to bridge building. Thus, in the use of the actual PVP (B), it is preferable to confirm the K value in use.

The solvent (C) is a common good solvent capable of dissolving both of the polymer (A) and the PVP (B). For example, in a case where polyvinylidene fluoride is used as the polymer (A), as the common good solvent, dimethylacetamide (hereinafter, referred to as "DMAc"), dimethylformamide (hereinafter, referred to as "DMF"), dimethyl sulfoxide, N-methyl-2-pyrrolidone (hereinafter, referred to as "NMP"), trimethyl phosphate or the like is used, and particularly, DMAc and NMP are preferably used. Further, they may be mixed for use.

When the film-forming dope is prepared using the above-described polymer (A), PVP (B) and solvent (C), according to the invention, the film-forming dope is prepared so that the viscosity of the film-forming dope at a membrane production temperature is 100 to 500 Pa·s.

Further, here, the membrane production temperature represents temperature of the film-forming dope at the time when the film-forming dope is immersed in a solidifying fluid.

Here, when the viscosity of the film-forming dope is 100 Pa·s or less, generation of macrovoids is noticeable. On the other hand, if the viscosity of the film-forming dope exceeds 500 Pa·s, generation of macrovoids is suppressed, but it is difficult to prepare or produce the film-forming dope.

In such a film-forming dope, since the PVP (B) has a low molecular weight of the K value of 50 to 80, the PVP (B) is easily removed, and thus, a problem that removal of the hydrophilic polymer is difficult does not occur. Further, since the viscosity of the film-forming dope is 100 to 500 Pa·s, a problem that preparation or production of the film-forming dope is difficult does not occur, and thus, it is possible to suppress macrovoids. Further, by using an appropriate amount of a low-molecular-weight PVP (B) without excessive use thereof, it is possible to form a porous membrane having a three-dimensional network structure having excellent water permeability and superior filtration performance.

As the film-forming dope prepared in this way is discharged through a discharge nozzle or the like and is immersed in the solidifying fluid, the polymer (A) is solidified, and thus, a hollow fiber shaped porous membrane formed of the polymer (A) and the PVP (B) is obtained. The film-forming dope is made as a single layer, or is stacked as two or more layers, and normally, four layers or fewer, and is then immersed in the solidifying fluid. After discharge and before film-forming dope reaches a solidification tank that contains the solidifying fluid, an idle running section may be arranged (dry and wet spinning) or may not be arranged (wet spinning).

The solidifying fluid used herein should be a non-solvent of the polymer (A) and a good solvent of the PVP (B), and includes water, ethanol, methanol or the like, and particularly, a liquid mixture of a solvent used as the solvent (C) and water is preferable in view of safety and operational management. Particularly, in a case where the mixing rate of the solvent (C) is 50% or less, the time necessary for solidification is short and productivity is favorable, which is preferable. Further, it is more preferable that the moisture percentage be 70% or less. On the other hand, due to elution of the solvent (C) to the solidifying fluid from the film-forming dope, in order to constantly maintain composition of the solidifying fluid, it is preferable that the mixing rate of the solvent (C) be 1% or less.

Further, as the discharge nozzle used herein, it is possible to select the nozzle according to the type of the porous membrane. For example, in a case where an annular nozzle is used, it is possible to produce a hollow fiber membrane as the porous membrane. As the type of the porous membrane produced according to the invention, a flat membrane or the like may be used, in addition to the hollow shape.

Further, in order to further enhance the intensity of the porous membrane, it is possible to arrange a reinforcement fiber, braid or the like, inside or on the surface of the porous membrane, for example. For example, specifically, in a case where the hollow fiber membrane is produced, it is preferable to arrange a hollow braid or the like.

Further, when the hollow fiber membrane is produced, in order to strictly control vertical pore distribution in a length direction, a method of simultaneously discharging plural types of film-forming dopes using a multi-walled piping nozzle may be employed. In this case, in view of formation of the three-dimensional network structure and washability of polyvinyl pyrrolidone, it is preferable that the PVP (B) having the low molecular weight with the K value of 50 to 80 be used for all the layers and the above-described film-forming dope of which the viscosity satisfies 100 to 500 Pa·s be used.

If the film-forming dope is discharged to the solidifying fluid in this way, as the solidifying fluid is diffused in the film-forming dope, the polymer (A) and the PVP (B) cause phase separation, respectively. As the polymer (A) and the PVP (B) are solidified while causing the phase separation in this way, a three-dimensional network structure in which the polymer (A) and the PVP (B) penetrate into each other is obtained.

The method of layering the film-forming dope into two or more layers is not particularly limited. For example, a method of respectively discharging, using a triple-walled annular nozzle having a central part, an inner part and an outer part, the film-forming dope through the inner part and the outer part while passing the hollow support or the solidifying fluid through the central part, may be used, if the film-forming dope is layered into two layers in a hollow shape. Further, in a case where the number of layers increases, a nozzle in which the inner part and/or the outer part is further divided is installed, and the hollow support, the solidifying fluid or the film-forming dope is appropriately discharged through the respective nozzle parts. Further, in a case where the film-forming dope is layered into two or more layers in a film shape, for example, a method of simultaneously or sequentially flow-casting plural undiluted solutions on the support for layering may be employed.

According to the production method of the invention, it is possible to form a three-dimensional network structure having high water permeability and superior filtration performance, which will be described as follows.

That is, it is known that the membrane structure formed by coagulation is considerably affected by the viscosity of the undiluted solution, and the molecular weights and the mass ratio of the polymer that forms the membrane base and the hydrophilic polymer. This is because the viscosity of the undiluted solution, and the respective molecular weights and the mass ratio of the respective polymers affect the speed at which the respective polymers are phase-separated.

Further, in the porous membrane due to the wet spinning (non-solvent phase separation), a structural defect called macrovoids easily occurs and is particularly noticeable as the surface structure is dense. In order to suppress the occurrence of macrovoids, it is efficient to use a high-molecular-weight polymer as the polymer that forms the membrane base, to increase the viscosity of the film-forming dope. However, in the related art, in a case where the high-molecular-weight polymer is used as the polymer that forms the membrane base, unless any one of a method of also using the high-molecular-weight polymer as the hydrophilic polymer and a method of excessively using a low-molecular-weight polymer as the hydrophilic polymer is employed, an excellent membrane structure cannot be obtained. However, there is a problem in that the high-molecular-weight polymer is difficult to remove. On the other hand, if a large amount of hydrophilic polymer having a low molecular weight is used, if a recovery process is not provided, a problem occurs in cost, which is not preferable.

In consideration of these situations, the present inventors focused on the mass ratio of the polymer that forms the base (that is, polymer (A)) and the PVP in a case where a low-molecular-weight PVP is used as the hydrophilic polymer. Further, the present inventors have found that if the film-forming dope is prepared so that the mass ratio satisfies a specific relationship and the viscosity of the film-forming dope at that time is in a specific range, by using an appropriate amount of hydrophilic polymer having a low molecular weight capable of being easily removed without using a large amount, it is possible to produce a porous membrane of a three-dimensional network structure in which macrovoids are suppressed and high water permeability and superior filtration performance are achieved.

Since when macrovoids are present in the vicinity of the surface of the porous membrane, the macrovoids easily cause defects, it is preferable that the macrovoids not be present in a part of the porous membrane that is distant from the surface of the membrane by 150 μm or less. It is more preferable that the macrovoids not be present in a part of the porous membrane that is distant from the surface of the membrane by 250 μm or less. It is most preferable that the macrovoids not be substantially present in the porous membrane.

The presence or absence of generation of such macrovoids may be Confirmed by observing a cross-sectional structure using a scanning electron microscope. Here, it should be noted that, when the observation using the scanning electron microscope is performed, if a magnification is lower than 500 times, it is difficult to observe the macrovoids, and on the other hand, if the magnification is equal to or greater than 5000 times which is a high magnification, the field of view is narrowed and it is thus necessary to perform measurement plural times for observation of a specific area. In this description, in a case where the observation is performed with a magnification of 1000 times, when the number of macrovoids included in an image is one or less, this is defined as a case where the macrovoids are not substantially present. When the observation is performed with a high magnification, it is preferable to increase the number of photographed sheets according to the observation area for confirmation.

In a step in which the film-forming dope is immersed in the solidified liquid and solidification is completed, a large amount of PVP (B) remains in the obtained porous membrane. Thus, the porous membrane as such has low water permeability, and the mechanical strength of the membrane decreases due to drying and hardening of the PVP (B). Thus, after solidification, removal of the PVP (B) is performed.

As a method of removing the PVP (B), a method of cleaning and removing the PVP (B) is preferable, and particularly, a cleaning method using water is preferable in view of production cost or the like. In this case, in order to enhance the cleaning speed, it is more preferable to further use a decomposition process of the PVP (B) using an oxidizing agent or the like.

By removing the PVP (B) in this way, it is preferable to set the amount of the PVP (B) that remains in the porous membrane to 2 mass % or less with respect to the mass of the polymer (A) (mass of the membrane base), and more preferable to set the amount to 1 mass % or less. If the removal is performed to this extent, it is possible to sufficiently enhance water permeability, and to suppress reduction in mechanical strength due to drying and hardening of the PVP (B).

The remaining amount of the PVP (B) may be measured by an arbitrary method, and for example, may be quantified by measurement of infrared transmission and absorption spectrum. Specifically, the porous membrane is dissolved in the same solvent as the solvent used as the solvent (C), the solution is flow-cast on a slide glass, and then, the solvent is evaporated for removal to form a film. With respect to the film produced in this way, the infrared transmission and adsorption spectrum is measured by a Fourier transform infrared spectrophotometer, and the remaining amount of the PVP (B) may be calculated using the following Expression (2) from an absorbance of 1400 cm$^{-1}$ and 1675 cm$^{-1}$ of the obtained infrared transmission and absorption spectrum.

[Expression 2]

$$\text{Remaining amount of } PVP \text{ (mass \% to membrane base)} = \quad (2)$$
$$(\text{absorbance of } 1675 \text{ cm}^{-1}/\text{absorbance of } 1400 \text{ cm}^{-1}) \times 26.3$$

In a case where the porous membrane produced in this way is used in water treatment, it is preferable to set the thickness to 500 μm or less. This is because, by setting the thickness to 500 μm or less, transmission resistance in membrane separation decreases, excellent water permeability is obtained, and suppression of macrovoids is effective. Further, with such a thickness, it is possible to suppress reduction in membrane strength due to coarsening of the internal structure of the membrane. More preferably, the thickness is 400 μm or less.

Further, in view of suppression of leakage due to generation of physical damage on the surface of the membrane, it is preferable that the thickness of the membrane be 10 μm or more.

EXAMPLES

Hereinafter, the invention will be described in more detail on the basis of examples.

Example 1

[Respective Components]

As the polymer (A) that forms the membrane base, polyvinylidene fluoride made by ARKEMA JAPAN (product name: Kynar 301F) was used.

As the PVP (B), K80-M (product name; made by NIPPON SHOKUBAI Co., Ltd.) was used.

As the solvent (C), DMAc (special grade made by Wako Pure Chemical Industries, Ltd.) was used.

[Calculation of K Value]

The PVP (B) was dissolved in ultra pure water to prepare an aqueous solution of 1 mass %, the kinematic viscosities of the ultra pure water and the PVP aqueous solution were measured using a Cannon-Fenske kinematic viscosity tube having a viscometer number of 200, and the K value was calculated using the relational expression (1). The result was shown in Table 1.

[Viscosity Measurement]

Further, the polymer (A) and the PVP (B) were dissolved in the DMAc at a temperature of 50° C. at a composition of polymer (A):PVP (B):DMAc=19:10:71 (mass ratio) to prepare a film-forming dope, and the film-forming dope was put in a cone/plate viscometer HBDV-II+Pro and a CPE-52 spindle made by BROOKFIELD Engineering Labs and its viscosity was measured.

[Production of Porous Membrane]

A porous membrane was produced using the film-forming dope produced as described above.

Specifically, firstly, the film-forming dope was flowed into a hole of a diameter of 8 mm formed in a silicon rubber plate of a thickness of 0.5 mm fixed on a slide glass.

Then, the film-forming dope was cooled to 22° C., and then, the extra film-forming dope on the silicon rubber plate was removed. Thereafter, the film-forming dope was immersed together with silicon rubber plate for 5 minutes in a solidifying fluid made of an aqueous solution of DMAc 5 mass % that was retained at 70° C., and the film-forming dope was solidified to form the porous membrane.

Thereafter, the porous membrane was extracted together with silicon rubber plate from the solidifying fluid, and the solidified porous membrane was extracted from the silicon rubber plate.

Subsequently, the porous membrane was immersed in a sodium hypochlorite aqueous solution of about 1 mass % for 12 hours to decompose and remove the PVP (B), and then, the resultant was cleaned with water for 12 hours and was then dried.

After drying, a structure up to 250 μm from the upper surface (surface that was firstly in contact with the solidifying fluid) of the obtained porous membrane was observed using a scanning electronic microscope (S-3400 N made by Hitachi, Ltd.) (hereinafter, referred to as "SEM").

Here, after the obtained porous membrane was immersed in liquid nitrogen for freezing, the porous membrane was appropriately cut by a blade, and plural cutting surfaces were observed. The obtained porous membrane had a three-dimensional network structure, and macrovoids were not found.

Example 2

A porous membrane was produced by the same method as that of Example 1, except that the porous membrane extracted from the silicon rubber plate was immersed in a sodium hypochlorite aqueous solution of about 1 mass % at 60° C. to decompose and remove the PVP (B), and the resultant was cleaned with water for 1 hour at 22° C.

Further, the amount of the PVP that remained in the porous membrane after drying was measured by the following procedure.

Measurement of Amount of PVP

A solution in which the porous membrane was dissolved in the DMAc was flow-cast on the slide glass, and then, the DMAc was evaporated for removal to produce a film. With respect to this film, an infrared transmission and adsorption spectrum was measured by a Nicolet 4700 Fourier transform infrared spectrophotometer made by Thermo Fisher Scientific K.K.

The remaining amount of the PVP was calculated using Expression (2) from an absorbance of 1400 $cm^{-1}$ and 1675 $cm^{-1}$ of the obtained infrared transmission and adsorption spectrum. The calculated remaining amount of the PVP was 0.8 mass %.

Example 3

A porous membrane was produced and SEM observation was performed by the same method as that of Example 2, except that NMP (special grade made by Wako Pure Chemical industries, Ltd.) was used as the solvent (C). Further, viscosity measurement was similarly performed. The obtained porous membrane had a three-dimensional network structure, and macrovoids were not found.

Example 4

A porous membrane was produced and SEM observation was performed by the same method as that of Example 2, except that PVP-K50 made by DAI-ICHI KOGYO SEIYAKU Co., Ltd. was used as the PVP (B), and the polymer (A) and the PVP (B) were dissolved in the DMAc at a temperature of 50° C. at a composition of polymer (A):PVP (B):NMP=18:16:66 (mass ratio) to prepare a film-forming dope. Further, viscosity measurement was similarly performed. The obtained porous membrane had a three-dimensional network structure, and macrovoids were not found.

Comparative Example 1

A porous membrane was produced by the same method as that of Example 1, except that a film-forming dope was prepared with a combination of polymer (A):PVP (B):DMAc=20:8:72 (mass ratio).

SEM observation was performed for the porous membrane. Macrovoids were found, and a membrane structure was a closed cell structure, instead of a three-dimensional network structure.

Comparative Example 2

As the polymer (A), a material obtained by mixing polyvinylidene fluoride made by ARKEMA JAPAN (product name: Kynar 301F) and polyvinylidene fluoride made by ARKEMA JAPAN (product name: Kynar 9000) to become a mass ratio of 3:2 was used.

Further, the film-forming dope was prepared so as to have a ratio of polymer (A):PVP (B):DMAc=19:10:71 (mass ratio). Except for this, the porous membrane was produced by the same method as that of Example 1. Further, viscosity measurement was also similarly performed.

SEM observation was performed for the porous membrane. The obtained membrane had a three-dimensional network structure, but macrovoids were found, Comparative Example 3

A porous membrane was produced by the same method as that of Example 2, except that PVP-K30 made by NIPPON SHOKUBAI Co., Ltd. was used as the PVP (B). Further, viscosity measurement was also similarly performed.

SEM observation was performed for the porous membrane. The obtained membrane was a structure that had finger-like voids directly below the skin.

Comparative Example 4

A porous membrane was produced by the same method as that of Example 4, except that the polymer (A) and the PVP (B) were dissolved in the DMAc at a temperature of 50° C. at a composition of polymer (A):PVP (B):DMAc=19:10:71 (mass ratio) to prepare a film-forming dope.

SEM observation was performed for the porous membrane. Macrovoids were found, and a membrane structure was a closed cell structure, instead of a three-dimensional network structure.

Comparative Example 5

An undiluted solution was produced by the same method as that of Example 2, except that DMSO (special grade made by Wako Pure Chemical industries, Ltd.) was used as the solvent (C). Viscosity was measured, and as a result, the viscosity was 729 Pa·s or more. The undiluted solution did not flow into a hole of a silicon rubber plate, and thus, membrane production was not performed.

TABLE 1

| | Example 1 | Comparative example 1 | Comparative example 2 |
|---|---|---|---|
| K value of PVP(B) | 79 | 79 | 79 |
| η(A) [Pa·s] | 45 | 45 | 20 |
| η(B) [Pa·s] | 22 | 22 | 22 |
| $(\eta(A)/\eta(B))^{1/2}$ | 1.4 | 1.4 | 1.0 |
| Mass ratio r | 0.53 | 0.40 | 0.53 |
| $r/(\eta(A)/\eta(B))^{1/2}$ | 0.37 | 0.28 | 0.52 |
| Viscosity of film-forming dope [Pa·s] | 120 | 49 | 69 |

TABLE 1-continued

| | Example 1 | Comparative example 1 | Comparative example 2 |
|---|---|---|---|
| Membrane structure | Three-dimensional network structure | Closed cell structure | Three-dimensional network structure |
| Presence or absence of macrovoids | absence | presence | Presence |

INDUSTRIAL APPLICABILITY

According to the process for production of the invention, by using an appropriate amount of a low-molecular-weight hydrophilic polymer capable of being easily removed, it is possible to produce a porous membrane having a three-dimensional network structure in which macrovoids are suppressed, having excellent hydrophilic characteristic and superior filtration performance.

The invention claimed is:

1. A process for production of a porous membrane having a three-dimensional network structure in which macrovoids are suppressed comprising:
    (i) layering a film-forming dope that contains a polymer (A) that forms a membrane base, a polyvinylpyrrolidone (B) and a solvent (C) into a single layer or more layers,
    (ii) solidifying said film-forming dope by immersing the film-forming dope in a solidifying fluid that is a non-solvent with respect to the polymer (A) and is a good solvent with respect to the polyvinylpyrrolidone (B) to obtain said porous membrane,
    (iii) decomposing and removing the polyvinylpyrrolidone (B) which remains in said porous membrane until 2 mass % or less with respect to a mass of said polymer (A) by immersing said porous membrane in an aqueous solution comprising an oxidizing agent, and
    (iv) drying said porous membrane after step (iii),
    wherein the polymer (A) is polyvinylidene fluoride,
    the polyvinylpyrrolidone (B) has a K value of 50 to 80,
    a mass ratio r of the polyvinylpyrrolidone (B) to the polymer (A) is 0.5 or more and less than 1, and
    a viscosity of the film-forming dope at a membrane production temperature is 120 to 500 Pa·s.

2. The process according to claim 1, wherein the K value of the polyvinylpyrrolidone (B) is 50 to 60.

3. The process according to claim 1, wherein said oxidizing agent is sodium hypochlorite.

4. The process according to claim 1, wherein a concentration of polymer (A) is contained in said film-forming dope in an amount of 10 mass % or more.

5. The process according to claim 1, wherein a concentration of polymer (A) is contained in said film-forming dope in an amount of 15 mass % or more.

6. The process according to claim 1, wherein a concentration of polymer (A) is contained in said film-forming dope in an amount of 30 mass % or less.

7. The process according to claim 1, wherein a concentration of polymer (A) is contained in said film-forming dope in an amount of 25 mass % or less.

8. The process according to claim 1, wherein polymer (A) has a weight average molecular weight of 100,000 to 5,000,000.

* * * * *